United States Patent [19]

Jonas

[11] Patent Number: 5,295,375
[45] Date of Patent: Mar. 22, 1994

[54] ANTITHEFT GEAR LEVER LOCK FOR CARS

[76] Inventor: Elia Jonas, Via Antonio Arcioni No. 3, 00152 Rome, Italy

[21] Appl. No.: 960,857

[22] Filed: Oct. 14, 1992

[51] Int. Cl.$^5$ .............................................. B60R 25/06
[52] U.S. Cl. ........................................ 70/247; 70/203; 180/332; 248/551
[58] Field of Search .................. 70/201-203, 70/245-248, 237, 196; 248/551; 180/332

[56] References Cited

U.S. PATENT DOCUMENTS

| | | | |
|---|---|---|---|
| 4,693,099 | 9/1987 | Cykman | 70/247 |
| 4,812,182 | 3/1989 | Fang et al. | 148/330 |
| 4,825,670 | 5/1989 | Snow | 70/247 X |
| 5,141,119 | 8/1992 | Milazzo | 70/212 X |
| 5,228,320 | 7/1993 | Liou | 70/247 |

FOREIGN PATENT DOCUMENTS

| | | |
|---|---|---|
| 0489265 | 6/1992 | European Pat. Off. |
| 2552040 | 3/1985 | France . |

OTHER PUBLICATIONS

Locksmith Ledger International vol. 50, No. 11, Sep. 1990, pp. 16-17.
Database WPI Abstract, JP-A-55 131160, Mitsubishi Steel, Oct. 1980.

*Primary Examiner*—Lloyd A. Gall
*Attorney, Agent, or Firm*—Stevens, Davis, Miller & Mosher

[57] ABSTRACT

An antitheft gear lever lock for cars comprising a bracket (1) forged by manganese steel under solubilized state having a Brinell hardness of approximately 220 kg/mm$^2$. The bracket is formed with an end section (2) provided with throughholes (3) for fastening bolts (12) and being able to be subjected to one or more bendings (8). The bracket (1) has further an elongated intermediate section (6) provided with one or more bendings (8', 8") approaching the gear lever (14) and has a head section (4) provided with holes (5) for the connection to the antitheft padlock closure mechanism (16) which is supported by the bracket (1). The antitheft padlock closure mechanism is adapted to lock a gear lever (14) by a bend (28) embracing and retaining the gear lever (14) in the operative position and the bend (28) is able to reach its rest position by an easy rotational movement.

11 Claims, 5 Drawing Sheets

ANTITHEFT GEAR LEVER LOCK FOR CARS

BACKGROUND OF THE INVENTION

The present invention relates to an antitheft gear lever lock for cars in the form of a bracket locking the gear lever to the floor of the car.

Antitheft devices for cars locking mechanically the gear lever are known. They essentially consist of a padlock closure mechanism with a body which is rigidly connected to one end of a bracket, the other end of which is bolted to the floor of the car, and with a bend supported by such body which can be snap-locked to and unlocked from the latter and in the operating position is caused to embrace the gear lever in order to lock it in the reverse gear position in case of cars with manually operated gear shift and in the park position in case of cars with automatic gearshift.

However, such antitheft devices have some drawbacks. One drawback relates to the locking bracket of the padlock closure mechanism. Such drawback consists in that the brackets used hitherto are not made of a material which is plastic enough to be easily bent by a fitter so that there is no chance to adapt the brackets to any car model and then a particular bracket must be used every time. A second drawback relates to the body including the padlock closure mechanism which is supported by the bracket when the gear lever lock has to be brought to the rest position. Presently, the body is provided at the upper side with a groove and two tabs standing from said body and parallel to and urged away from each other by a spring. A bend is slidingly inserted into such groove so as to engage said tabs in order to overcome the force of the spring and to reach its rest position. The described operation is very hard to be carried out by the driver.

SUMMARY OF THE INVENTION

As far as the first drawback is concerned it was surprisingly found that the manganese steel under solubilized state having a Brinnel hardness of approximately 220 kg/mm$^2$ has in combination hardness and plasticity such as to provide a bracket which is hard enough to withstand to cutting nippers, saw, picklock or the like burglary tool, and at the same time plastic enough to be easily bent and adapted to any car. In order to overcome the second drawback, the padlock closure mechanism is provided at the upper side with a mount having a two openings adapted to receive the two parallel ends of the locking bend introduced by the driver from above with a suitable angle of inclination. The openings are adjacent to the spring-loaded tabs, the plane of such openings being parallel to the axis of the spring loading the tabs. The bend is introduced in a slanting attitude until its parallel arms abut the spring-loaded tabs from above. The rest position of the bend is then reached by an easy rotation of the same about an axis parallel to that of the spring, thus urging the tabs against the action of such spring, the edge of said openings acting as a bearing in such rotation.

Therefore, an object of the present invention is an antitheft gear lever lock for cars which is characterized in combination by: a bracket forged by manganese steel under solubilized state and having a Brinell hardness of approximately 220 kg/mm$^2$, said bracket being sized and formed as well as provided with a set holes in one end part such as to allow it to be applied to any car by a fitter through an appropriate, easy bending of the bracket which is then bolted to the floor of the car through the most suitable holes; a padlock closure mechanism supported by said bracket and adapted to lock the gear lever by a bend embracing and retaining said lever in the operative position and being able to reach its rest position by an easy rotation movement. The bracket is further characterized in that is part not provided with the set of holes, i.e. that part standing up from the floor, is subjected to a hardening by surface nitrocarburizing.

BRIEF DESCRIPTION OF THE DRAWING

The present invention will be better understood with reference to the accompanying drawings which show by way of a non-limitative example a preferred embodiment thereof. In the drawings:

FIG. 5 shows the bend of the gear lever lock.

DESCRIPTION OF THE PREFERRED EMBODIMENT

Figure 1:
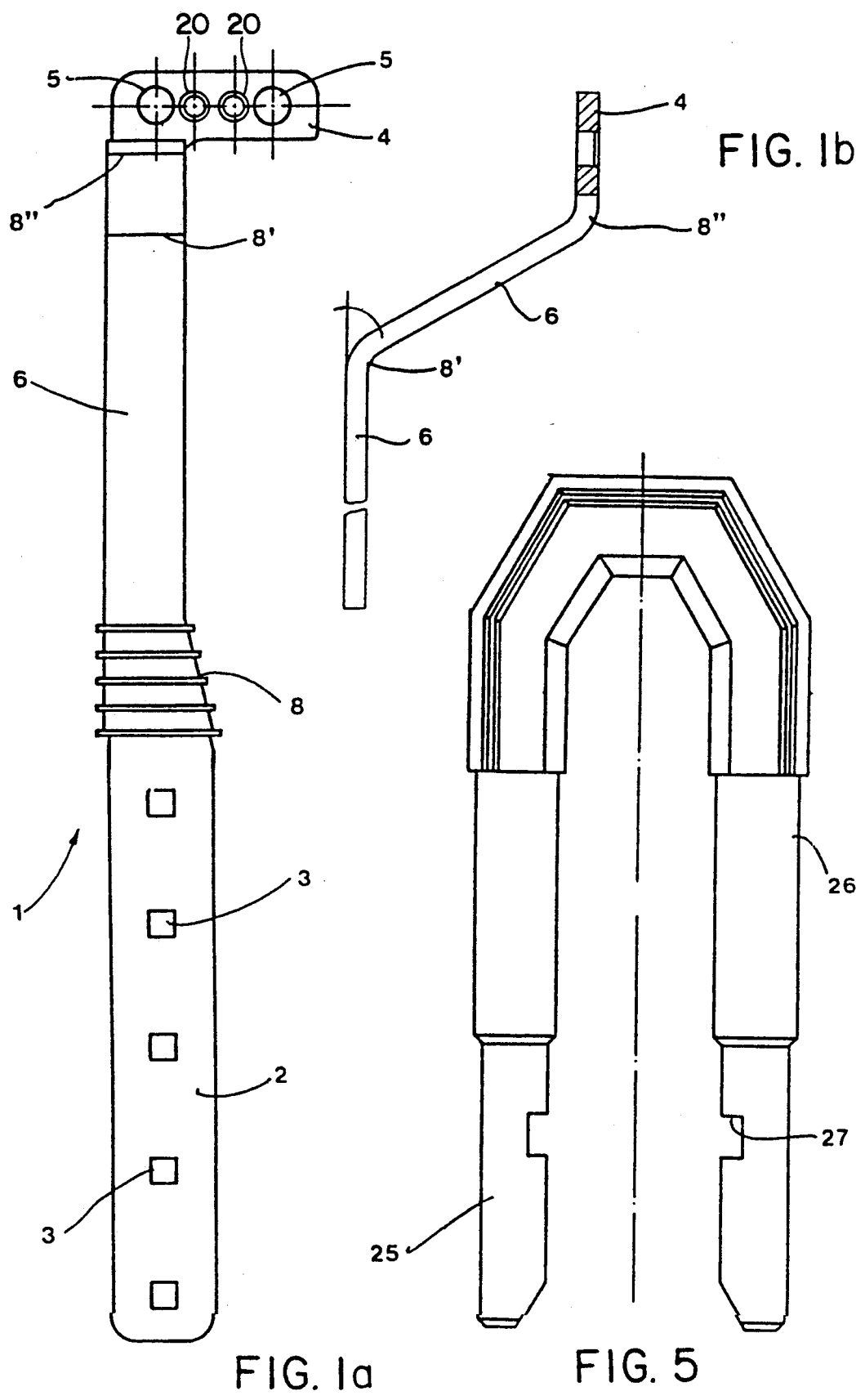
FIGS. 1a and 1b show a front and a side view of the bracket.

As shown in FIGS. 1a and 1b bracket 1 has an end section 2 provided with fixing holes 3 for its bolting to the floor 10 of the car, a head member 4 provided with holes 5 and 20 for the connection through holes 20 by Phillips screws 22 to the antitheft padlock closure mechanism 16 and an intermediate member 6, at the end of which was bracket can be bent to be fitted to the car. Both head and intermediate members are subjected to hardening by nitrocarburizing.

Figure 2:
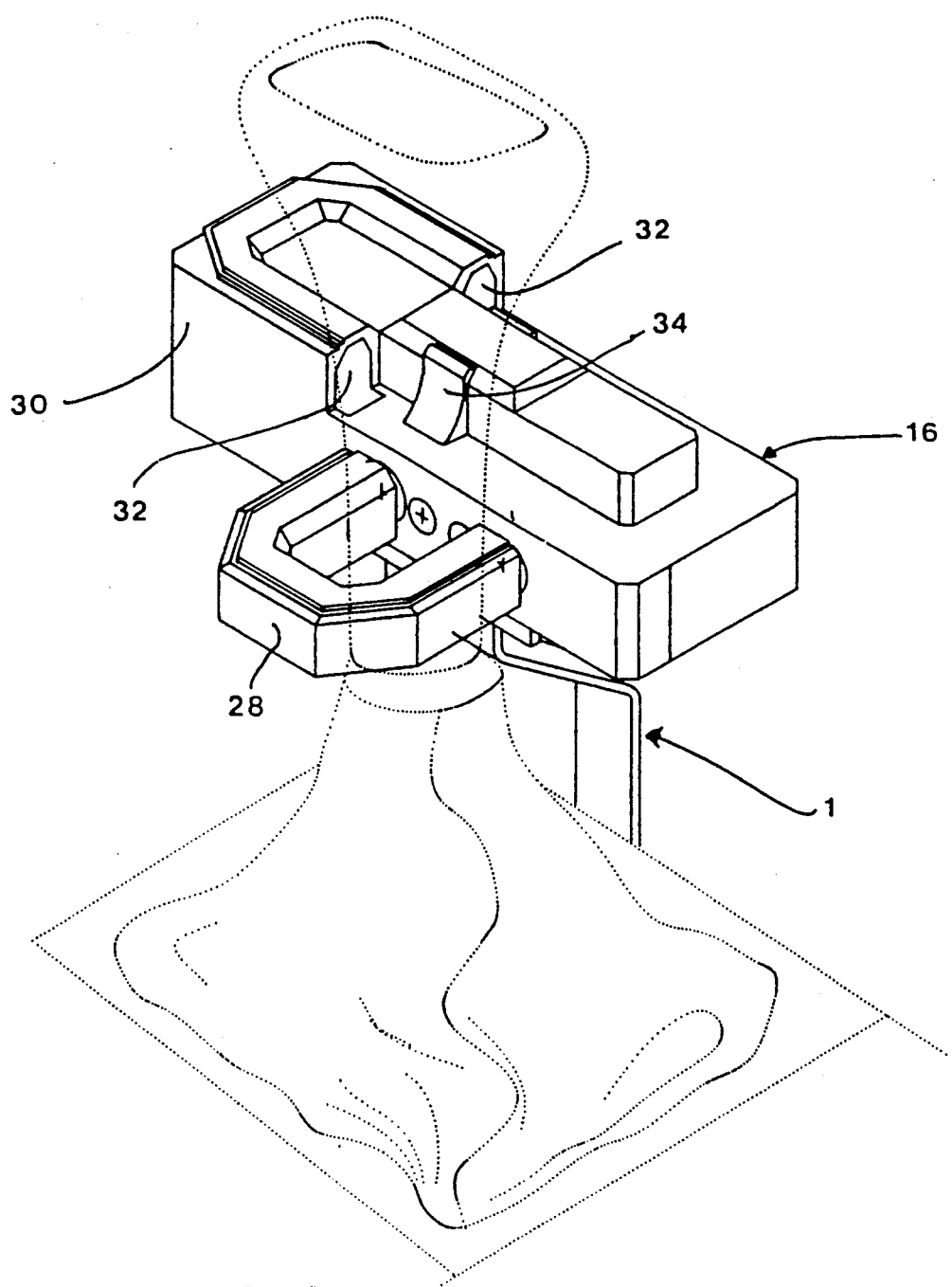
FIG. 2 is a perspective view of the gear lever lock of this invention under operative conditions.
Figure 4A:
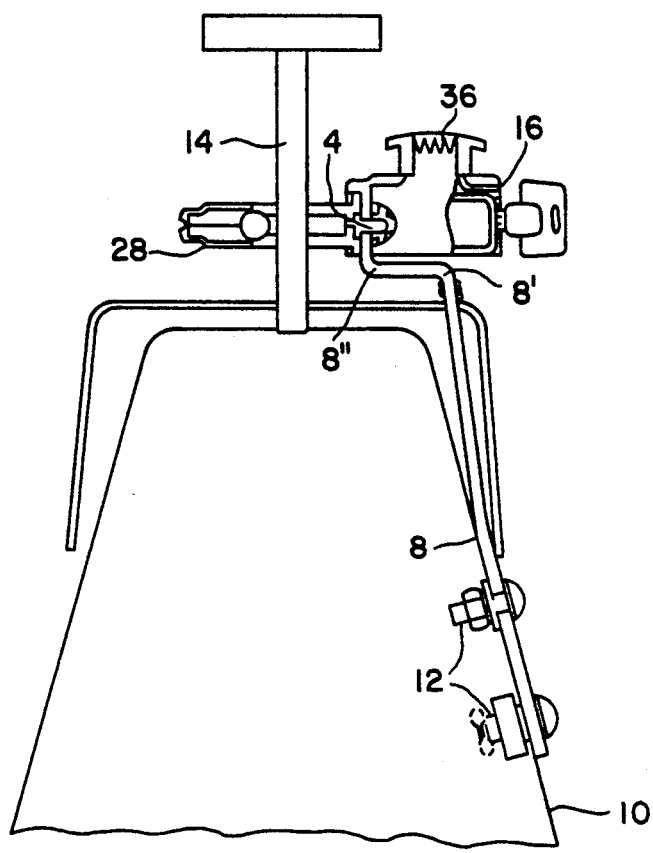
FIG. 4a and 4b show two embodiments of the gear lever lock mechanism.
Figure 4B:
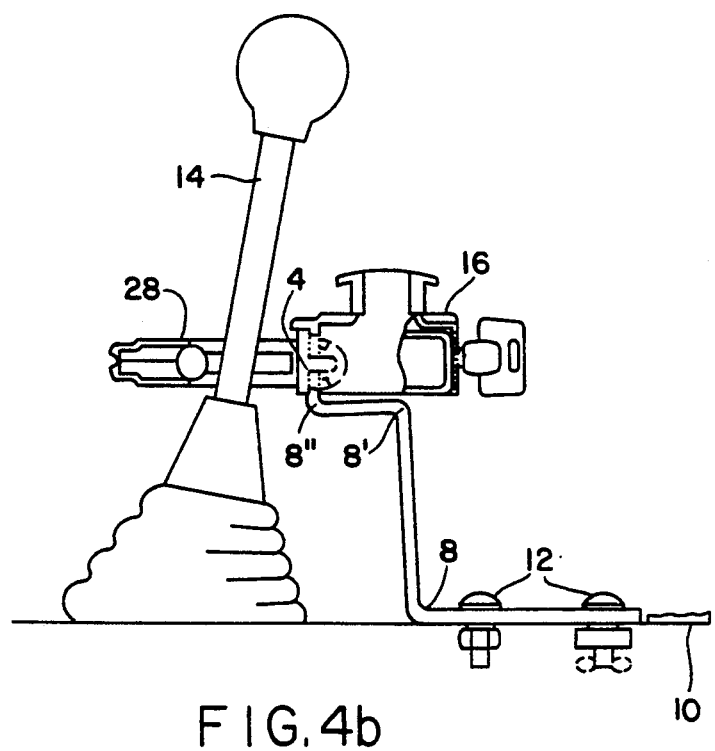

As shown in FIGS. 1b, 4a and 4b, bracket 1, which has been bent at 8', 8" before the nitrocarburizing in order to be adapted to the gear lever 14, is bent at 8 when being assembled, i.e. before the connection to the floor 10 of the car by means of anti-burglary bolts 12 screwed through holes 3 so that head 4 of the bracket is brought near gear lever 14 to support the padlock mechanism 16. The padlock mechanism 16 comprises an essentially rectangular box-like body 18 housing in a cavity the padlock (not shown) aligned with the through-holes 24 and holes 23. Holes 23 seat screws 22. The diameter of said through-holes 24 corresponds to that of the ends 25 of the arms 26 of the bend 28 locking the gear lever in the operative position, as shown in FIGS. 2, 4a and 4b. The bend 28 has two parallel arms 26 with ends 25 having less diameter and provided with notches 27 to be engaged by the padlock.

Figure 3A:
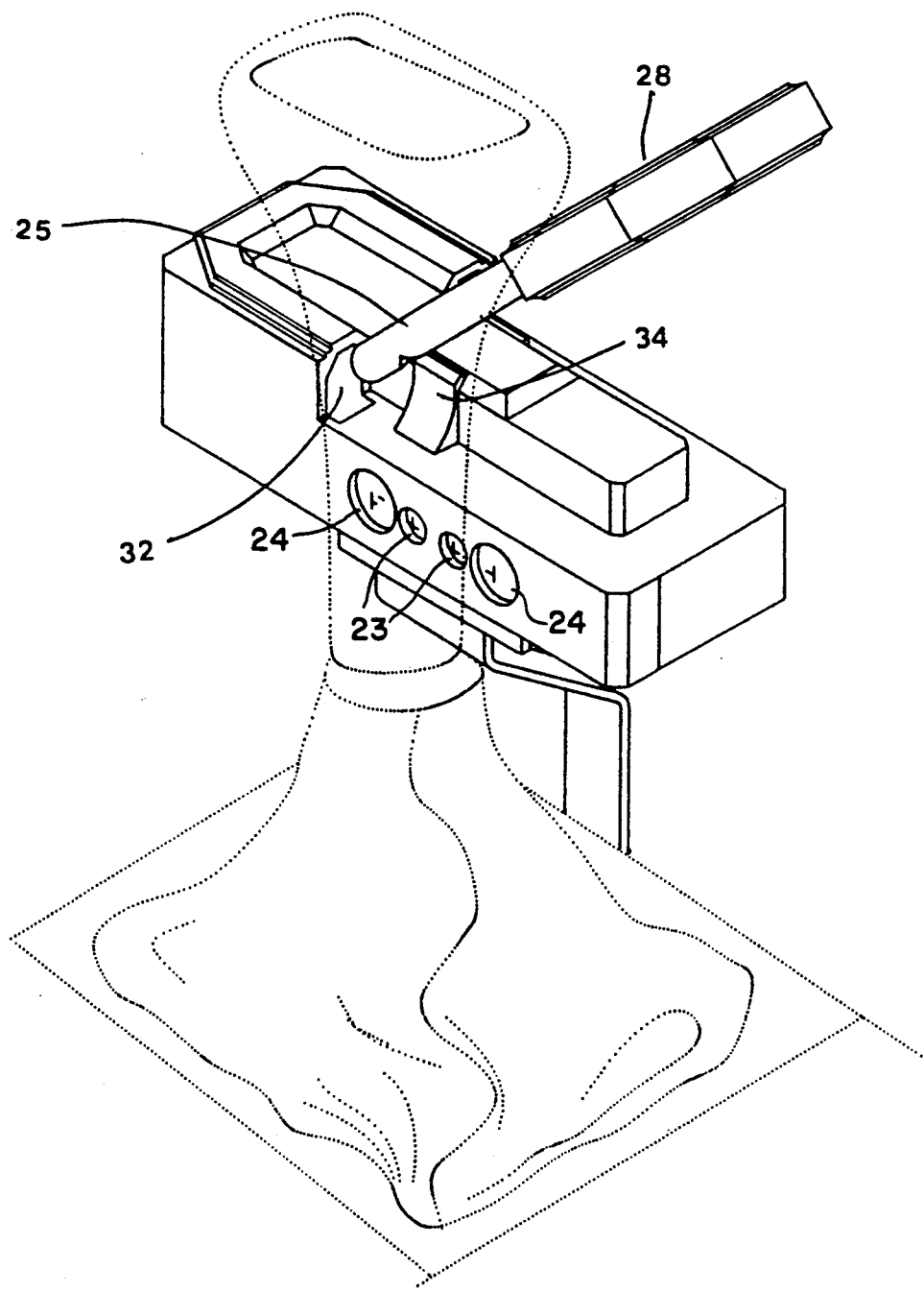
FIGS. 3a and 3b are two perspective views of the same gear lever lock under rest conditions with the locking bend in a first inclinated position and in the final position.
Figure 3B:
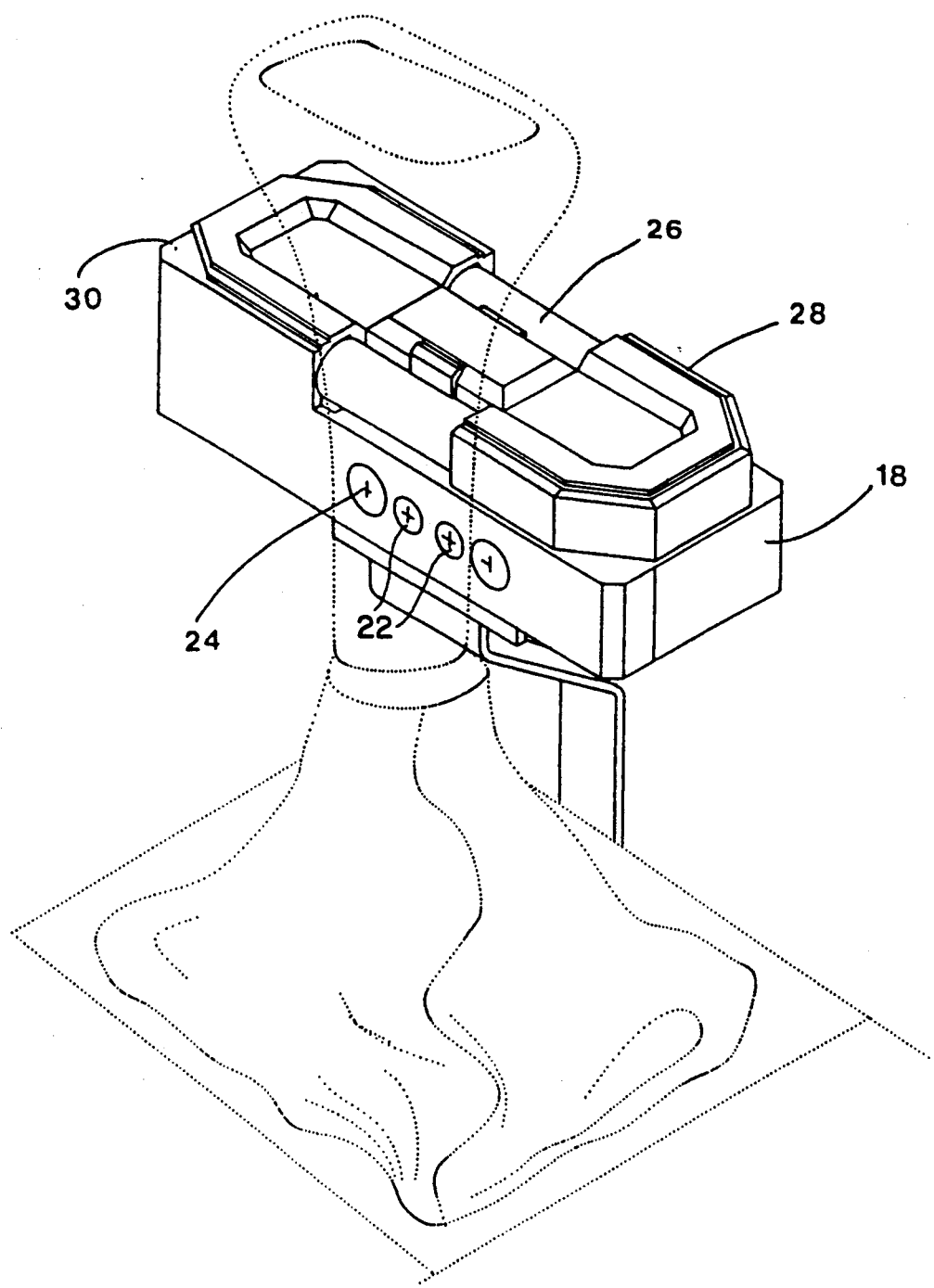

In order to arrange the bend in its rest position, the box-like body is provided at its upper side with a mount 30 in the form of a T having two openings 32 in the shorter portion of the T with one hole on either side of the larger portion of the T and two tabs 34 with one tab mounted on each side of the longer portion of the T. The two openings 32 are adapted to receive from above the ends 25 of the arms 26 at an angle of inclination. Two tabs 34 are arranged parallel to and urged away from each other by a spring 36 having an axis lying parallel to the plane of the two openings 32. The openings 32 have such a diameter as to be able to receive only the ends 25 of the arms 26. In this position the arms 26 abut against the openings 32 and the tabs 34 (FIG. 3a). Once having inserted the ends 25 into the openings 32 the driver rotates the bend 28 downward against the spring-loaded tabs 34 until the horizontal rest position of the bend is reached (FIG. 3b).

The present invention has been described and illustrated with reference to a preferred embodiment thereof, however, it is obvious that changes and/or modifications can be made by those skilled in the art without departing from the scope of the appended claims.

I claim:

1. A universally adaptable gear lever lock for cars comprising a bracket forged in one piece from manganese steel of about 220 Kg/mm$^2$ Brinell hardness, said bracket having
   a vertical head section provided with a means for attaching to the vertical head section an anti-theft locking mechanism for locking a gear lever to the bracket;
   an intermediate section extending downwards at an angle from the vertical head section; and
   a tail section extending vertically downward from the intermediate section, provided with a means for securing the bracket to a car;
   said head and intermediate sections having been surface hardened so that the tail section remains bendable allowing in situ custom-fitting of the gear lever lock to the car and the anti-theft locking mechanism attached to said vertical head section.

2. The gear lever lock according to claim 1 wherein the head and intermediate sections are hardened by surface nitrocarburization.

3. The gear lever lock according to claim 1 including a shackle wherein the anti-theft locking mechanism includes on its upper part a shackle storage device comprising a horizontally disposed track ending with a section perpendicular to said track having two openings for receiving the shackle, said track provided with a means for allowing insertion of the shackle into the openings and track by applying a downward force.

4. The gear lever lock of claim 3 including at least one upwardly tapering spring loaded tab placed vertically along the horizontal track so that the shackle is inserted obliquely into the openings and guided and lockable into the horizontal inserted position by the spring loaded tab upon application of a downward force.

5. The gear lever lock of claim 3 wherein two spring-loaded tabs are symmetrically positioned on the track with the spring placed between them so as to exert an outward force on the tabs, the axis of symmetry being horizontal extending outwardly between the openings.

6. An antitheft gear lever lock for cars, comprising a bendable bracket (1) forged by manganese steel under solubilized state having a Brinell hardness of approximately 220 kg/mm$^2$, said bracket (1) having and end section (2) provided with through-holes (3) for fastening with bolts (12) to a floor of a car and being subject to one or more bendings (8), and elongated intermediate section (6) provided with one ore more bendings (8', 8") and a head section (4) provided with holes, a closure mechanism (16) connected to said bracket (1), said closure mechanism (16) being supported by said bracket (1) and a bend (28) having parallel arms and parallel ends fittable within said holes and capable of embracing and retaining a gear lever (14) in an operative position when inserted.

7. The antitheft gear lever lock of claim 6, wherein both head section (4) and intermediate section (6) are hardened by surface nitrocarburizing after being bent to a desired shape.

8. The antitheft gear lever lock of claim 6, wherein said closure mechanism (16) has an upper side with a mount (30) having two openings (32) adapted to receive the two parallel ends (25) of the arms (26) of the bend (28) in a slanting attitude.

9. The antitheft gear lever lock of claim 8, including two tabs (34) mounted on said closure mechanism and a spring positioned between said tabs biasing said tabs away from each other and wherein a plane of said openings (32) is parallel to the axis of said spring and said openings are spaced therefrom.

10. The antitheft gear lever lock of claim 8, wherein said bend (28) has said ends (25) of a diameter less than the diameter of said arms (26), and the diameter of said arms (26) is larger than that of said openings (32).

11. The antitheft gear lever lock of claim 6, wherein said closure mechanism defines two openings (32), said ends (25) having a diameter less than the diameter of said arms (26) and the diameter of said arms (26) is larger than that of said openings (32).

* * * * *